United States Patent [19]

Suzuki et al.

[11] 4,160,591
[45] Jul. 10, 1979

[54] CAMERA HAVING AN ELECTRICALLY TIMED SHUTTER

[75] Inventors: Toyotoshi Suzuki, Tokyo; Kazunari Matsuzaki, Yokohama, both of Japan

[73] Assignee: Canon Kabushiki Kaisha, Tokyo, Japan

[21] Appl. No.: 877,747

[22] Filed: Feb. 14, 1978

[30] Foreign Application Priority Data

Feb. 23, 1977 [JP] Japan .................................. 52/18966

[51] Int. Cl.² .......................... G03B 9/08; G03B 9/40
[52] U.S. Cl. .................................... 354/235; 354/246
[58] Field of Search ........................ 354/234, 235, 246

[56] References Cited

U.S. PATENT DOCUMENTS

| 3,082,673 | 3/1963 | Takahama | 354/246 |
| 3,715,959 | 2/1973 | Harvey | 354/246 X |
| 3,777,646 | 12/1973 | Shimizu | 354/235 |
| 3,829,877 | 8/1974 | Kitai | 354/246 |
| 3,952,317 | 4/1976 | Galbraith | 354/246 X |
| 3,964,081 | 6/1976 | Pickering | 354/246 |

Primary Examiner—Donald A. Griffin
Attorney, Agent, or Firm—Toren, McGeady and Stanger

[57] ABSTRACT

A camera with a shutter including opening and closing blades releasable, respectively, in response to a mechanical actuation and exposure control circuit for making an exposure which is assured by energizing the solenoid of an electromagnet with power supply from a battery. When the voltage of the battery drops below a satisfactory operating level, the opening blade is locked in automatic response to the mechanical actuation, and a shutter charging and film winding mechanism is no longer effective to operate, thereby preventing wasteful consumption of film due to blank exposures. Upon removal of the battery from a chamber therefor, the shutter charging and film winding mechanism is rendered again effective, and the release of the closing blade is mechanically retarded for a certain length of time from the mechanical release actuation of the opening blade.

2 Claims, 9 Drawing Figures

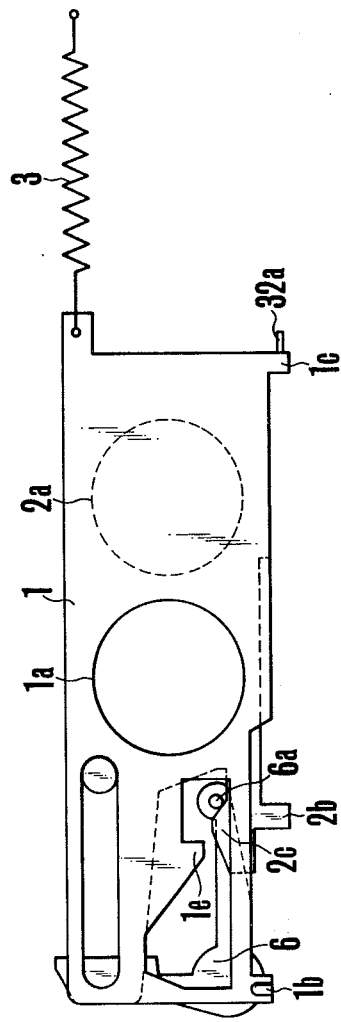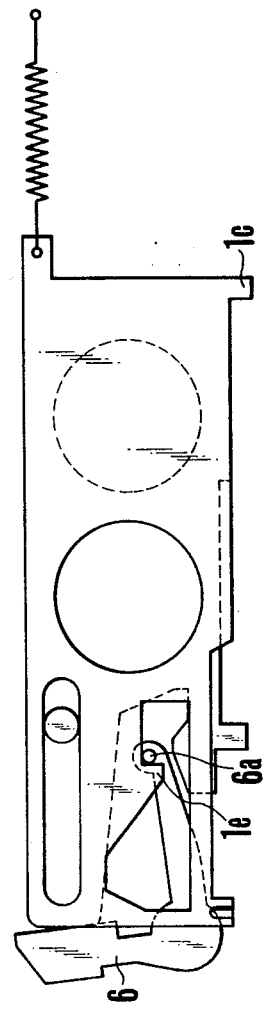

CAMERA HAVING AN ELECTRICALLY TIMED SHUTTER

BACKGROUND OF THE INVENTION

This invention relates to photographic cameras having an electrically timed shutter, and more particularly to a shutter release control device which enables the shutter mechanism to operate in a mechanically timed mode as set from the electrically timed mode when the battery no longer supplies sufficient electrically energy.

In the use of electrical shutter control circuits, because power sources must generally be adapted for incorporation in the camera housing they therefore usually comprise batteries of small size and small capacity. When the electrical energy in the battery is dissipated with loss in voltage below a satisfactory operating level, the accuracy of shutter control is decreased to an unacceptable level as known in the art. Particularly with an electrically timed shutter of the type in which the opening operation of the shutter is mechanically actuated and the closing operation is controlled by the use of an electromagnet, when the voltage of the battery drops below the satisfactory operating level, the electromagnet is no longer effective to retain the rear shutter curtain or closing blade in an exposure aperture blocking position, with the result that the release actuation of the front shutter curtain or opening blade is immediately followed by accidental movement of the closing blade resulting in failure to expose the associated film. What is worse in this case is that the photographer is often not aware of the occurrence of such faulty operation.

In order to avoid this problem, a solution has been proposed as, for example, in U.S. Pat. No. 3,768,390. According to this proposal, when the normal operation of the electromagnet is not assured, the shutter release is locked, and thus the operator is unable to proceed to a later sequence of exposures. Such a conventional shutter release control device though advantageous from the standpoint of preventing the film from being fed without exposures tends to make difficult the ability to photograph under spontaneous circumstances even if one were willing to accept some loss in the accuracy of exposure control.

SUMMARY OF THE INVENTION

The present invention has for its general object to enable a photographer to meet the above mentioned requirement and to provide a camera whose shutter can be set from an electrically timed mode to a mechanically timed mode when the energized electromagnet is no longer effective to retain the closing blade in an exposure aperture open position.

To achieve this, there is provided a shutter locking mechanism responsive to the ineffectiveness of the energized electromagnet for locking an opening blade along with a closing blade in the reset position in automatic response to the manual actuation of shutter release, whereby the photographer is informed of the fact that the actual voltage of the battery has fallen below a satisfactory operating level.

Upon removal of the battery from a chamber therefor, the locking mechanism is no longer effective to maintain the shutter in the reset position, and a mechanical control device of predetermined delay time is brought into operative connection with the shutter blades.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

FIG. 8 is a partial front elevation view of the opening and closing blades with an electromagnet energized to be effective to retain the closing blade in open position.

FIG. 9 is a view corresponding to FIG. 8, showing the illustrated elements in the positions assumed thereby when the shutter locking mechanism is operated.

DESCRIPTION OF THE PREFERRED EMBODIMENT

Figure 1:
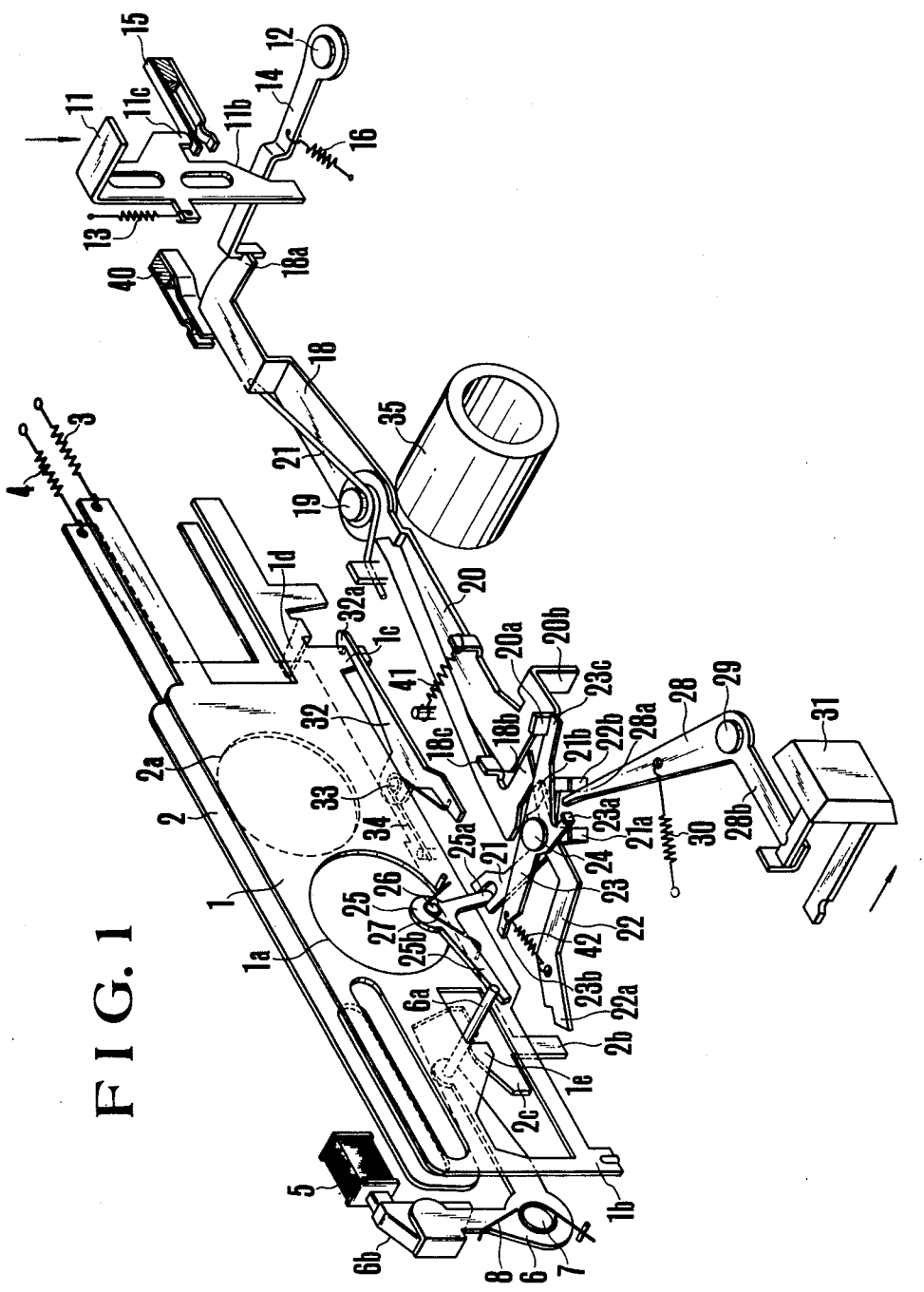
FIG. 1 is a perspective view of an embodiment of a camera shutter according to the present invention in its charged position.

Referring now to FIG. 1, the shutter is shown schematically as including a pair of planar opaque blades or opening and closing blades 1 and 2 provided with exposure orifices 1a and 2a respectively and arranged to be reciprocable in respective paths normal to the optical axis of an objective in a barrel 35 as guided by slots engaging in respective pins (not shown), in a space between the lens 35 with diaphragm means (not shown) and a film (not shown). The opening and closing blades 1 and 2 tend to move toward exposure aperture open and closed positions respectively by the action of drive springs 3 and 4. Prior to initiation of exposure, the blades 1 and 2 are held in the illustrated positions by a latch or lever 32 engaging at its pawl 32a with a latch projection 1c downwardly extending from the forward end of the main body of the opening blade 1. A latch spring 34 engaged with the lever 32 urges the latter into latching contact with the projection 1c. A reset bar 1d is formed in the forward end of the blade 1 and extends normal thereto into the path of movement of the closing blade 2. When the opening blade 1 is held in blocking position by the latch lever 32, the bar 1d is effective to engage blade 2 and to maintain the latter in the open position against the bias of the spring 4.

Figure 3:
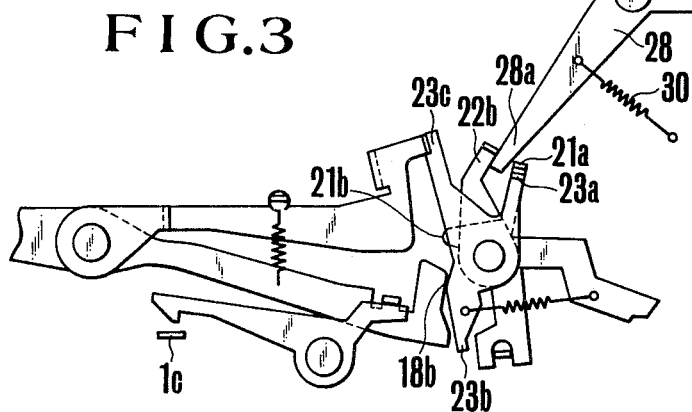
FIG. 3 is a view corresponding to FIG. 2, showing the illustrated parts in the positions assumed thereby following start of movement of the opening blade.

A shutter release actuating mechanism includes a shutter button (not shown) and a trip or slide 11 responsive to manual depression of the button to move in a downward direction against the bias of a spring 13. Such movement causes a power supply control switch 15 to be closed by an actuator projection 11c at an initial phase thereof, and then a detent lever 14 to be turned about a pivot 12 in a clockwise direction against the bias of a spring 16 out of engagement with a release control lever 18 at one end 18a thereof as a tapered portion 11b of the slide 11 acts on the lever 14. Upon disengagement of the detent lever 14 from the release control lever 18, the latter turns about a pivot 19 in a clockwise direction under the action of a spring 21 to strike the latch 32 at its tail by an upwardly extending projection 18c, thereby the latch 32 is turned in a clockwise direction against the bias of spring 34 as shown in FIG. 3, causing the opening blade 1 to run down to an unblocking position, whereby the bar 1d is no longer effective to maintain the closing blade in its open position.

At the time of closure of the switch 15, however, the solenoid of an electromagnet 5 is energized with power supply from a battery (not shown) to keep an armature 6b in latching contact with the core of the electromagnet 5 or in the illustrated position to which the armature 6b was moved by the action of a return spring 8 when the shutter was cocked. The spring 8 urges a bellcrank lever 6 with the armature 6b carried on a vertically extending arm thereof to turn about a shaft 7 in a clockwise direction. This occurs provided that the actual voltage of the battery is above a satisfactory operating level at which a preselected current in the solenoid is sufficient to establish an attractive force between the core and the armature. The force required exceeds the separating force exerted on the end of a horizontally extending arm of the bellcrank lever 6 by the combined biasing action of the drive spring 4 and a release actuating lever 25 through a rod 6a. The rod 6a extends from the end of the horizontally extending arm of lever 6 normal thereto into the path of movement of a latch projection 2c and therefrom through a cutout provided in a rear portion of the opening blade 1 into the path of movement of one arm 25b of the actuating lever 25. This attractive force is also sufficient to resist a dynamic load applied to the rod 6a by the lever arm 25b when the release control lever 18 is actuated to be turned with its camming surface 18b being moved away from a hump 21b of a fork lever 21 as shown in FIG. 3 with simultaneous occurrence of clockwise movement of the lever 25 under the action of a bias spring 27 which continues until the arm 25 abuts against the rod 6a.

Figure 4:
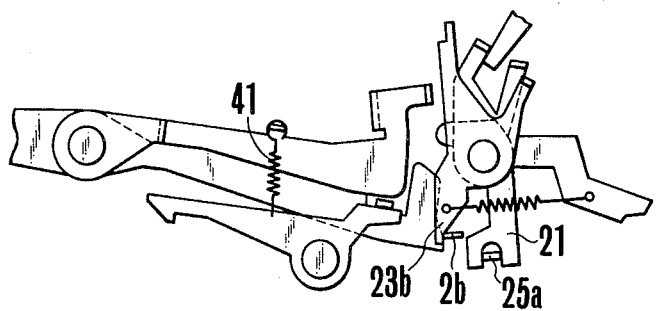
FIG. 4 is a view corresponding to FIGS. 2 and 3, showing the illustrated parts in the positions assumed at the time of release of the closing blade.
Figure 5:
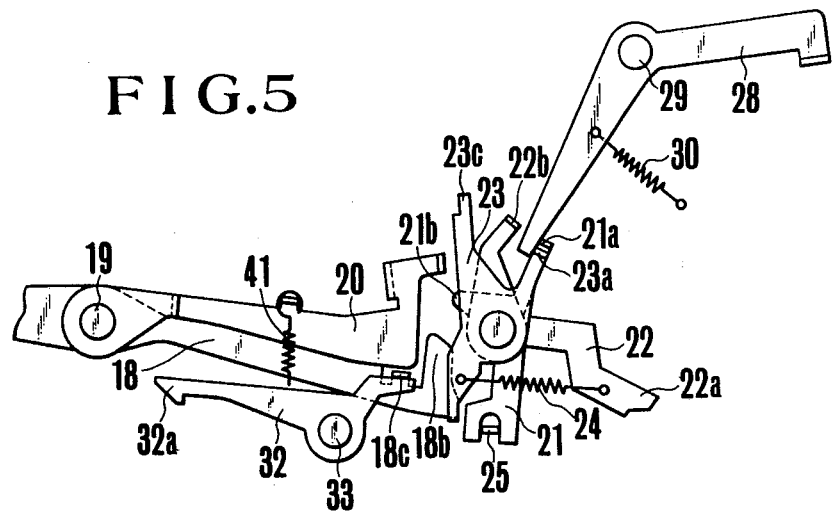
FIG. 5 is a top elevational view, showing the setting of a selector to the mechanically timed mode with the various moving parts responsive thereto after the manual actuation of shutter release.

Since the blade 1 moves to an unblocking position while the energized electromagnet 5 retains the blade 2 in open position, exposure is initiated. At the termination of duration of a shutter time as determined by an automatic exposure control circuit (not shown) in response to opening of a switch 40, the electromagnet solenoid is deenergized, causing the latching rod 6a to be moved upward against the bias of spring 8 by the action of the actuating lever 25 powered by the spring 27. Therefore, the closing blade 2 is driven into movement by the spring 4. When such movement nears the terminal end thereof, a downwardly extending projection 2b of the closing blade 2 strikes a three-armed lever 23 at one arm end 23b thereof as shown in FIG. 4. Thereby the lever 23 is disengaged at another arm end 23c from an upwardly extending projection 20a of a lever 20 movably mounted on the common pivot pin 19 of the release control lever 18. Upon disengagement of the lever 23 from the lever 20, the latter is turned in a clockwise direction by the action of a spring 41 from the position shown in FIGS. 1 to 3 where it is impossible to effect operation of a film winding and shutter charging mechanism to the position shown in FIG. 4 where this mechanism is rendered operative to advance the film through the length of one picture frame, as a downwardly extending projection 20b is acted on to release locking connection of the charging mechanism.

After exposure is terminated, both of the blades 1 and 2 are in the open and closed positions respectively, with the reset bar 1d again engaged with the blade 2. When a film winding lever (not shown) is cocked, the blades 1 and 2 are returned to their normal positions shown in FIG. 1, the release control lever 18 is again engaged with the lever 14 with simultaneous occurrence of driving engagement of the camming portion 18b with the hump 21b of the fork lever 21 which in turn causes counter-clockwise movement of the actuating lever 25 as an arm 23 is freely fitted into a space within the forked portion of the lever 21, and the shutter charge control lever 20 is brought into latching engagement with the lever 23. For this purpose, a spring 42 is connected between an arm 23b and one arm 22a of a lever 22 both pivotally mounted on a pin 24 common to each and to the fork lever 21. The spring 42 is pre-tensioned with the lever 22 set in position out of the path of movement of the projection 2b so long as the battery chamber is closed by a cover 31 to retain a shutter control mode selector or lever 28 in the position illustrated in FIGS. 1 to 4 against the bias of a spring 30 which is stronger than the spring 42 and also against the bias of the spring 42 in engagement at one arm 28b with the cover 31, the opposite arm 28a of which is in bearing contact with a downwardly extending projection 22b.

Now assuming that the actual voltage of the battery drops below the aforesaid satisfactory operating level, when the shutter button is depressed to move the trip slide 11 in the downward direction, the release lever 18 is turned clockwise with the camming portion 18b being moved away from the hump 21b of the fork lever 21. In this case, because of lack of sufficient attractive force between the core and the armature 6b, the actuating lever 25 is turned by the action of spring 27 thereby pushing the rod 6a in the upward direction out of engagement with the projection 2c and into latched engagement with a protuberance 1e of the opening blade 1 as shown in FIGS. 8 and 9. Further clockwise movement of the release lever 18, causes disengagement of the latch lever 32 from the opening blade 1 and does not result in initiation of exposure. At this time, the shutter charge control lever 20 remains in the latched position so that the photographer is made aware of the fact that the battery has lost its effectiveness.

When the cover 31 is opened by movement in a direction indicated by the arrow in FIG. 3, the changeover lever 28 is turned about a pivot 29 under the action of the spring 30, and the lever 22 is turned about the pivot pin 24 in a clockwise direction to follow the changeover lever 28 in engagement therewith at 22b with the arm 28a until the arm end 22a is in latching engagement with the projection 2b of the closing blade 2. As the lever 28 is further turned, the fork lever 21 and a three-armed lever 23 are also actuated to turn about the common pivot pin 24 in a clockwise direction in engagement at 23a and 21a with the arm 28a so that the lever 23 is no longer effective to retain the lever 20 in the latched position. Furthermore the fork lever 21 is moved away from the rod 6a to leave the latter in frictionally arrested engagement with the protuberance 1e under the action of spring 3.

Figure 6:
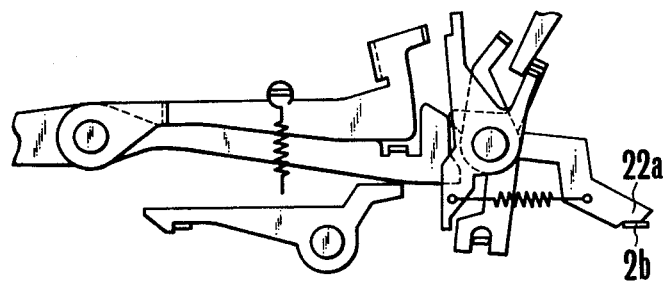
FIG. 6 is a view corresponding to FIG. 5, showing the illustrated parts in the positions assumed thereby following shutter re-charging operation with the selector set in the mechanical control mode.

When the film winding lever is cocked, the blades 1 and 2 with the latches 32 and 6 are returned to the positions illustrated in FIGS. 6 and 8. Subsequently, the photographer may depress the shutter button, whereby the opening blade 1 is released from the latch 32. As the latch rod 6a is moved to engage with the projection 2c and taken out of the path of movement of the protuberance 1e by the cocking operation, the opening blade 1 is able to move to the exposure aperture fully open position.

Figure 7:
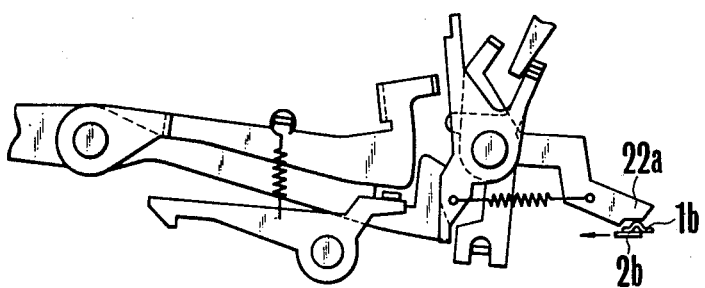
FIG. 7 is a view corresponding to FIGS. 5 and 6, showing the illustrated parts in the positions assumed thereby at the terminal end of movement of the opening blade with the selector set in the mechanically timed mode.

As the lever 22 is rendered effective to retain the closing blade 2 in engagement at 22a with the projection 2b as shown in FIG. 6 so that the blade 2 remains in the open position, when the opening blade 1 nears the terminal end of its movement, a downwardly extending projection 1b of the rear end of the blade 1 arrives at a position near the projection 2b and is further driven by the spring 3 to enter a space between the projection 2b and the lever end 22a. As a result the lever 22 is slightly turned in a counter-clockwise direction to effect disengagement of the lever end 22a from the projection 2b as shown in FIG. 7. Upon disengagement of the lever 22 from the projection 2b, the closing blade 2 starts to move toward the aperture fully closed position. In the mechanically timed shutter control mode, therefore, the period of exposure is determined by the longitudinal distance which is established between the projections 1e and 1b. Because of the possibility of a foregoing evaluation of this period previously, a proper exposure can be made by controlling the size of the diaphragm aperture in accordance with the period. The photographer is thus afforded the opportunity of taking photographs without experiencing undue loss in the accuracy of exposure control over a relatively wide range of variation of light values. If it is desired to effect flash photography, then the cover 31 may be opened regardless of whether the voltage of the battery is above the satisfactory operating level and the camera may be switched from the electrically to the mechanically timed shutter control mode in which a fixed exposure time suited for flash photography can be advantageously established with assurance of the full open aperture.

Figure 2:
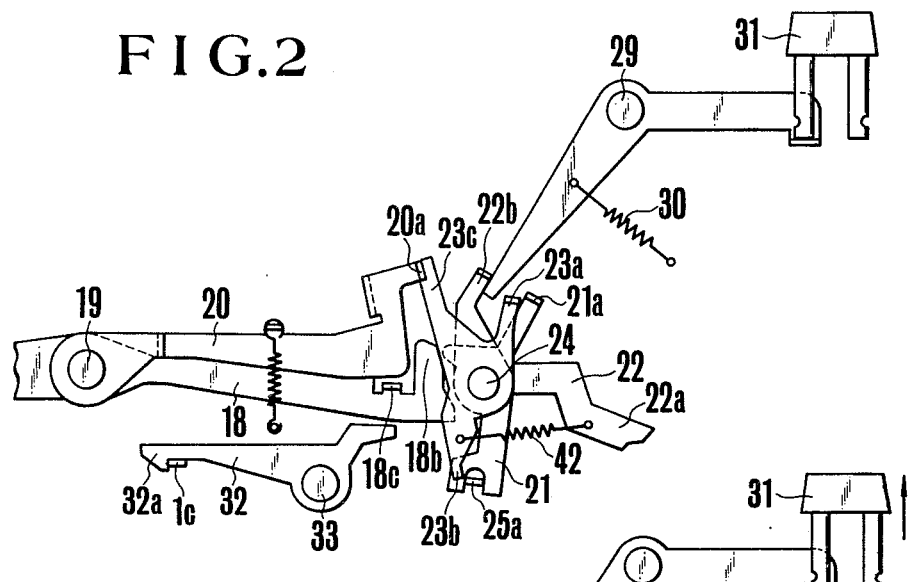
FIG. 2 is a top elevation view showing the essential parts of the invention when the shutter is in its charged position and when a battery chamber cover is in its closed position for selection of the electrically timed mode.

When a new battery is inserted into the chamber and the cover 31 is closed, the changeover lever 28 is turned in a clockwise direction against the force of spring 30, and the levers 21, 22 and 23 are returned to the positions shown in FIGS. 1 and 2 so the shutter is made operative in the electrically timed manner.

While a specific embodiment of the invention has been shown and described in detail to illustrate the application of the inventive principles, it will be understood that the invention may be embodied otherwise without departing such principles.

What is claimed is:

1. A camera including a housing and having an electrically timed shutter comprising:
   (a) a shutter opening member;
   (b) a shutter closing member;
   (c) mechanical release actuating means for actuating said shutter opening member to initiate exposure;
   (d) an exposure control circuit including a battery for electrical power supply and an electromagnet and controlling the period of actuation of the shutter;
   (e) first releasable latch means for said closing member movable, in response to the energized state of said electromagnet, between a position where said shutter closing member is latched and a position where said shutter closing member is released;
   (f) means causing said first latch means to be displaced to a position where said shutter opening member is locked in response to operation of said actuating means when said electromagnet is not supplied with sufficient electrical energy;
   (g) a battery chamber and a cover detachable from said chamber in said housing;
   (h) changeover means responsive to the detachment of the cover for releasing said shutter opening member from the locked position;
   (i) a second releasable latch means for latching said shutter closing member in response to said changeover means; and
   (j) means arranged upon movement of said shutter opening member to be displaced so that said closing member is released from said second latch means.

2. A camera including a housing and having an electrically timed shutter comprising:
   (a) a shutter opening member;
   (b) a shutter closing member;
   (c) winding means for charging the shutter in response to film advancement;
   (d) wind stopping means for stopping said winding means in response to the completion of advancement of film in said camera through one picture frame;
   (e) mechanical release actuating means for actuating said shutter opening member to initiate exposure:
   (f) an exposure control circuit including a battery for electrical power supply and an electromagnet and controlling the period of actuation of the shutter;
   (g) first releasable latch means for said closing member displaceable, in response to the energized state of said electromagnet, between a position where said shutter closing member is latched, and a position where said closing member is released;
   (h) wind stop release means for releasing said wind stopping means in response to running movement of said shutter closing member;
   (i) means causing said first latch means to be displaced to a position where said shutter opening member is locked in response to said release actuating means when said electromagnet is not supplied with sufficient electrical energy;
   (j) a battery chamber and a cover detachable from said chamber in said housing;
   (k) changeover means responsive to the detachment of the cover for releasing said shutter opening member from the locked position and for actuating said wind stop release means;
   (l) second releasable latch means for latching said shutter closing member in response to said changeover means; and
   (j) means responsive to the running movement of said shutter opening member for releasing said closing member from said second latch means.

* * * * *